(No Model.)

C. STEVENS.
TIRE UPSETTER.

No. 251,964. Patented Jan. 3, 1882.

Attest:
T. Walter Fowler
W. C. Huntemann

Inventor;
Charles Stevens
per Soulé & Koskogey,
Attorneys.

UNITED STATES PATENT OFFICE.

CHARLES STEVENS, OF RANDOLPH, VERMONT.

TIRE-UPSETTER.

SPECIFICATION forming part of Letters Patent No. 251,964, dated January 3, 1882.

Application filed December 9, 1880. (No model.)

*To all whom it may concern:*

Be it known that I, CHARLES STEVENS, a citizen of the United States, residing at Randolph, in the county of Orange and State of Vermont, have invented certain new and useful Improvements in Blacksmith's Tire-Upsetter and Helper; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

The object of my invention is to provide means for upsetting tires and for analogous purposes, whereby such work may be easily and cheaply performed.

Heretofore various machines of more or less complication have been used for upsetting tires preparatory to shrinking them for fitting to wheels, and owing to the expense and labor attendant upon the construction and employment of such machines the shrinking and fitting of tires have been rendered unnecessarily difficult.

My invention consists in combining with an ordinary anvil and block certain appliances of the construction hereinafter described.

Figure 1:
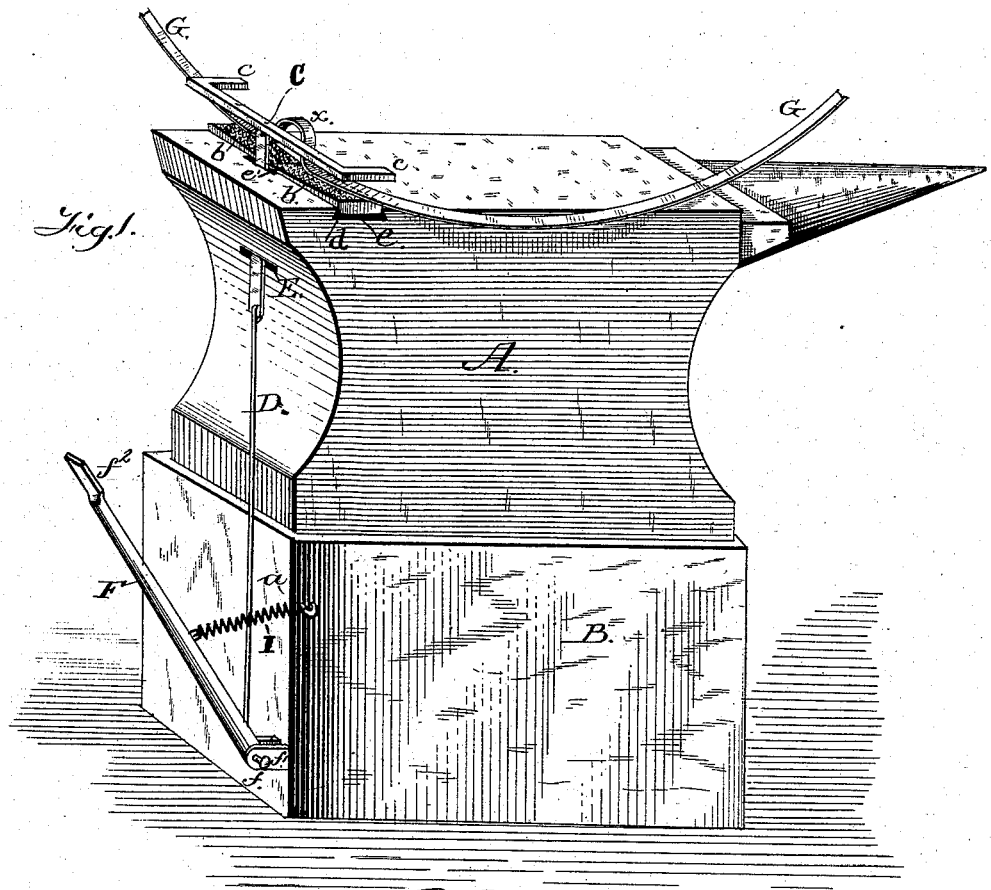
Figure 2:
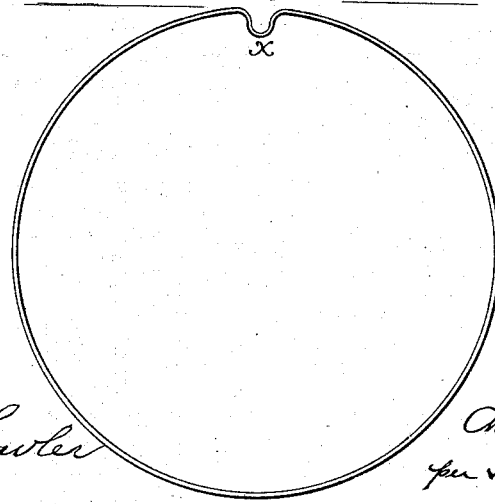

In the drawings, Figure 1 represents an anvil and block embodying my improvement with a tire applied thereto, and Fig. 2 is a view of a tire prepared for application to my device.

B represents an anvil-block of the ordinary construction, supporting an anvil, A. On top of the anvil, and at a point near its rear end, is secured a transverse swage, $b$, having its upper face roughened or notched. This swage may be secured in any suitable manner; but I prefer to slide it into a channel of the anvil, as shown, the side walls of the channel and the edges of the swage being slightly beveled, so that the latter will be held in place. The swage is preferably thicker at its ends $e$ than at the center, so that a depression, $e'$, is formed to allow the tire to take its curved form.

C represents a bar having at each end one or more clamping-arms, $c$, projecting over the swage $b$. This bar is supported upon a rod, D, which passes through the channel E of the anvil, and is pivoted at its lower end to a lever, F, the latter in turn having its inner end pivoted between brackets $f$, driven into or otherwise secured to the anvil-block at a point, $f'$, near the ground or floor, while its outer end terminates in a treadle, $f^2$. A spiral spring, I, connects the lever F with a projection, $a$, of the anvil-block. By the arrangement shown and described the clamping-arms $c$ of the bar C are located immediately over the swage, and by depressing the lever F are brought in contact with said swage; and it will be apparent that any article placed between the clamping-arms and the swage may be securely held with a vise-like grip.

The manner of applying my improvement to the upsetting of tires is as follows: The tire, after being heated to the required degree, is placed upon the horn of the anvil and by a blow from the sledge a bend or bulge, $x$, Fig. 2, is formed. The tire is then placed upon the swage of the anvil in the manner illustrated by Fig. 1 of the drawings, and the lever F is depressed and held down by the foot of the operator, thus forcing the clamping-arms $c$ of the bar C upon the tire, holding the latter securely between the clamps and the swage, the depression $c'$ affording a curved rest for the tire. While the tire is thus held its bend or bulge $x$ may be lapped upon an adjacent part of the tire by a sledge or otherwise and the shrinking of the tire effected. When the operation is finished and the foot of the operator removed from the lever F the latter will be raised by the spring I.

It is evident that the means above described may be applied to other purposes, and hence I would have it understood that while I especially design the same for use in connection with the shrinking and fitting of tires for wheels, I do not limit myself to such an application of the invention, but may use the latter in any instance where it is desired to temporarily clamp or hold an article upon an anvil.

I am aware that it is not broadly new to combine with an anvil and block a clamping-bar, standard, and operating-lever; but heretofore the standard has been arranged on one side of the anvil and held in place by keepers, the anvil-block has been made of two parts to permit the passage through it of the operating-lever, and almost the entire anvil-face used in operating the device, thus rendering the anvil incapable of use for ordinary purposes until the clamping devices are removed.

By my improved construction and arrangement of parts the tire-upsetting mechanism is conveniently located at the rear end of the anvil, and while said mechanism may be easily removed from the anvil, the latter may be readily used without such removal, since but a small part of the anvil-face is required to accommodate the clamping-bar and its projecting arms.

I do not claim, broadly, the combination, with an anvil and block, of clamping devices for upsetting tires; but

What I claim is—

The combination, with an anvil having a transverse dovetail groove in its upper face adjacent to the channel E, and an anvil-block having at its rear end the brackets $f$, of a swage, $b$, fitting said groove, a bar, C, having arms $c$, a rod, D, passing through the channel E and supporting the bar C, a lever, F, to which said rod is pivoted, and a spring connecting the lever with the anvil-block, substantially as described.

In testimony whereof I affix my signature in presence of two witnesses.

CHARLES STEVENS.

Witnesses:
 EDWIN J. McWAIN,
 W. W. BEAN.